(12) United States Patent
Ede

(10) Patent No.: US 7,174,408 B2
(45) Date of Patent: Feb. 6, 2007

(54) INTERFACE FOR SERIAL DATA COMMUNICATION

(75) Inventor: Clifford Ede, Surrey (GB)

(73) Assignee: Nokia Corporation, Espoo (FI)

( * ) Notice: Subject to any disclaimer, the term of this patent is extended or adjusted under 35 U.S.C. 154(b) by 190 days.

(21) Appl. No.: 10/722,961

(22) Filed: Nov. 26, 2003

(65) Prior Publication Data

US 2005/0114580 A1 May 26, 2005

(30) Foreign Application Priority Data

Nov. 22, 2003 (GB) ................................ 0327216.8

(51) Int. Cl.
G06F 13/36 (2006.01)
(52) U.S. Cl. ...................... 710/306; 710/105; 710/106; 710/305
(58) Field of Classification Search ................ 710/305, 710/306, 105, 106
See application file for complete search history.

(56) References Cited

U.S. PATENT DOCUMENTS

| 5,799,196 | A | * | 8/1998 | Flannery ...................... 713/320 |
| 5,961,624 | A | | 10/1999 | Takayama .................... 710/129 |
| 6,415,342 | B1 | | 7/2002 | Wahl et al. .................. 710/100 |
| 6,451,342 | B2 | * | 9/2002 | Adjei et al. .................. 424/474 |
| 6,622,178 | B1 | * | 9/2003 | Burke et al. .................... 710/15 |
| 6,625,750 | B1 | * | 9/2003 | Duso et al. .................... 714/11 |
| 6,898,652 | B2 | * | 5/2005 | Peters et al. ................. 710/300 |
| 2001/0001563 | A1 | * | 5/2001 | Tomasewski ............... 348/552 |
| 2003/0146765 | A1 | * | 8/2003 | Darshan et al. ............. 324/539 |

FOREIGN PATENT DOCUMENTS

WO    WO-03/019396 A1    3/2003

OTHER PUBLICATIONS

IEEE Computer Society. IEEE Std 802.3. Part 3: Carrier sense multiple access with collision detection (CSMA/CD) access method and physical layer specifications. The Institute of Electrical and Electronics Engineers, Inc. Mar. 8, 2002.*
Compaq et al. Universal Serial Bus Specification Revision 2.0. Apr. 27, 2000.*
McDermott, Tom. A Low-Cost 100 MHz Vector Network Analyzer with USB Interface. Jul./Aug. 2004. QEX.*
Purcell, Andy. The Search for a GPIB Replacement. 1999. IEEE. 169-177.*
"On-the-Go Supplement to the USB 2.0 Specification", Revision 1.0; Dec. 18, 2001; pp. 37-40.
Chandler, et al.; "On-The'Go Supplement to the USB 2.0 Specification"; Revision 1.0; Dec. 18, 2001.
Chandler, et al.; "On-The'Go Supplement to the USB 2.0 Specification"; Revision 1.0a; Jun. 24, 2003.

* cited by examiner

Primary Examiner—Mark H. Rinehart
Assistant Examiner—Matthew Spittle
(74) Attorney, Agent, or Firm—Harrington & Smith, LLP

(57) ABSTRACT

An interface connectable as a default host to a peripheral or as a default peripheral to a host, for serial data communication between host and peripheral during a session, and comprising: automated means for periodically checking a connection by periodically starting a session when connected as a default host and automated means for periodically checking a connection by periodically requesting a session when connected as a default peripheral.

21 Claims, 2 Drawing Sheets

INTERFACE FOR SERIAL DATA COMMUNICATION

TECHNICAL FIELD

Embodiments of the invention relate to an interface for serial data communication. In particular, embodiments relate to a Universal Serial Bus (USB) interface.

BACKGROUND OF THE INVENTION

The Universal serial bus (USB) is a cable bus that supports data exchange between a host and a wide range of simultaneously accessible peripherals. The attached peripherals share USB bandwidth through a host-scheduled, token-base protocol.

The USB system transfers data in bit serial format between the USB host and the USB peripheral. There is only one host in a USB system and it is master of the bus. The USB is a polled bus and the Host initiates all data transfers which are either a read from or a write to an endpoint.

In USB the role of host and peripheral is defined by which end of the cable a device is connected. If a device has an A receptacle for connection to an A-plug of the cable it is an A-device and if it has a B receptacle for connection to a B-plug it is a B-device. In USB an A-device provides power via a power contact Vbus to the B-device. The A-device is always the host and the B-device is always the peripheral.

The USB On-The-Go (OTG) supplement to USB allows a device to be dual mode. A dual mode device has a mini A/B connector that allows it to be connected to a mini A-plug as an A-device or to be connected to a mini B-plug as a B-device. As a default a dual mode device when connected as an A-device operates as a default host and when connected as a B-device operates as a default peripheral. However, OTG will enable the role of the dual-role device to change without reversing the cable. Thus the OTG device will be able to operate as a host or peripheral whether to is connected as an A-device or a B-device.

On the Go will also provide power saving features. In order to conserve power, OTG will allow an A-device to leave Vbus turned off when the serial bus is not being used.

However, turning off Vbus has, as yet, unappreciated disadvantages. In the absence of Vbus it is not possible for one device to detect automatically whether it has become connected to a device, or it is still connected to another device, or it is now connected to a different device. It would be desirable to maintain lower power consumption but enable automatic detection.

BRIEF SUMMARY OF THE INVENTION

According to one aspect of the present invention there is provided an interface connectable as a default host interface to a peripheral or as a default peripheral interface to a host, for serial data communication between a host and a peripheral during a session, and comprising: automated means for periodically checking a connection by periodically starting a session when connected as a default host interface and automated means for periodically checking a connection by periodically requesting a session when connected as a default peripheral interface.

According to another aspect of the present invention there is provided an interface, for serial data communication between a host and a peripheral, the interface connectable as a default host interface or as a default peripheral interface and comprising: a power signal contact; at least one data signal contact; transmission means for repeatedly sending a poll signal via the power signal contact; and reception means for receiving a reply signal via the power signal contact if the interface is connected as a default peripheral interface, and the data signal contact if the interface is connected as a default host interface.

According to another aspect of the present invention there is provided a host interface, for serial data communication between a host and a connected peripheral during a session, the host interface comprising: a power signal contact for supplying power to the connected peripheral; at least one data signal contact for serially communicating data between the host and connected peripheral; means for periodically checking for connection from the peripheral comprising: transmission means for repeatedly sending a poll signal via the power signal contact; reception means for receiving a reply signal via the data signal contact; and detection means for detecting the absence of a reply signal and the disconnection of the peripheral.

According to another aspect of the present invention there is provided a peripheral interface, for serial data communication between a connected host and a peripheral during a session, the peripheral interface comprising: a power signal contact for receiving power from the connected host; at least one data signal contact for serially communicating data between the connected host and peripheral; means for periodically checking for disconnection from the host comprising: transmission means for repeatedly sending a first poll signal via the power signal contact and for repeatedly sending a second poll signal via the data signal contact; reception means for receiving a reply signal via the power signal contact; detection means for detecting the absence of a reply signal and the disconnection of the peripheral.

According to another aspect of the present invention there is provided a method of checking a serial data connection between a device connected as host and a device connected as a peripheral, comprising: periodically starting a session at the device connected as host.

According to another aspect of the present invention there is provided a method of checking a serial data connection between a device connected as host and a device connected as a peripheral, comprising: periodically requesting the start of a session at the device connected as a peripheral.

According to another aspect of the present invention there is provided a method of checking a serial data connection between a dual mode device and another device, comprising: periodically starting a session at the device connected as host when the dual mode device is connected as a default host; and periodically requesting the start of a session at the device connected as a peripheral when the dual-mode device is connected as a default peripheral.

The term 'poll' in this document means to repeatedly check. Thus a 'poll signal' is a signal that is used to repeatedly check whether a device is connected/disconnected.

Embodiments of the invention enable power saving and the automatic detection of connection/disconnection of a USB device without user intervention.

BRIEF DESCRIPTION OF DRAWINGS

For a better understanding of the present invention reference will now be made by way of example only to the accompanying drawings in which.

DETAILED DESCRIPTION OF EMBODIMENT(S) OF THE INVENTION

Figure 1:
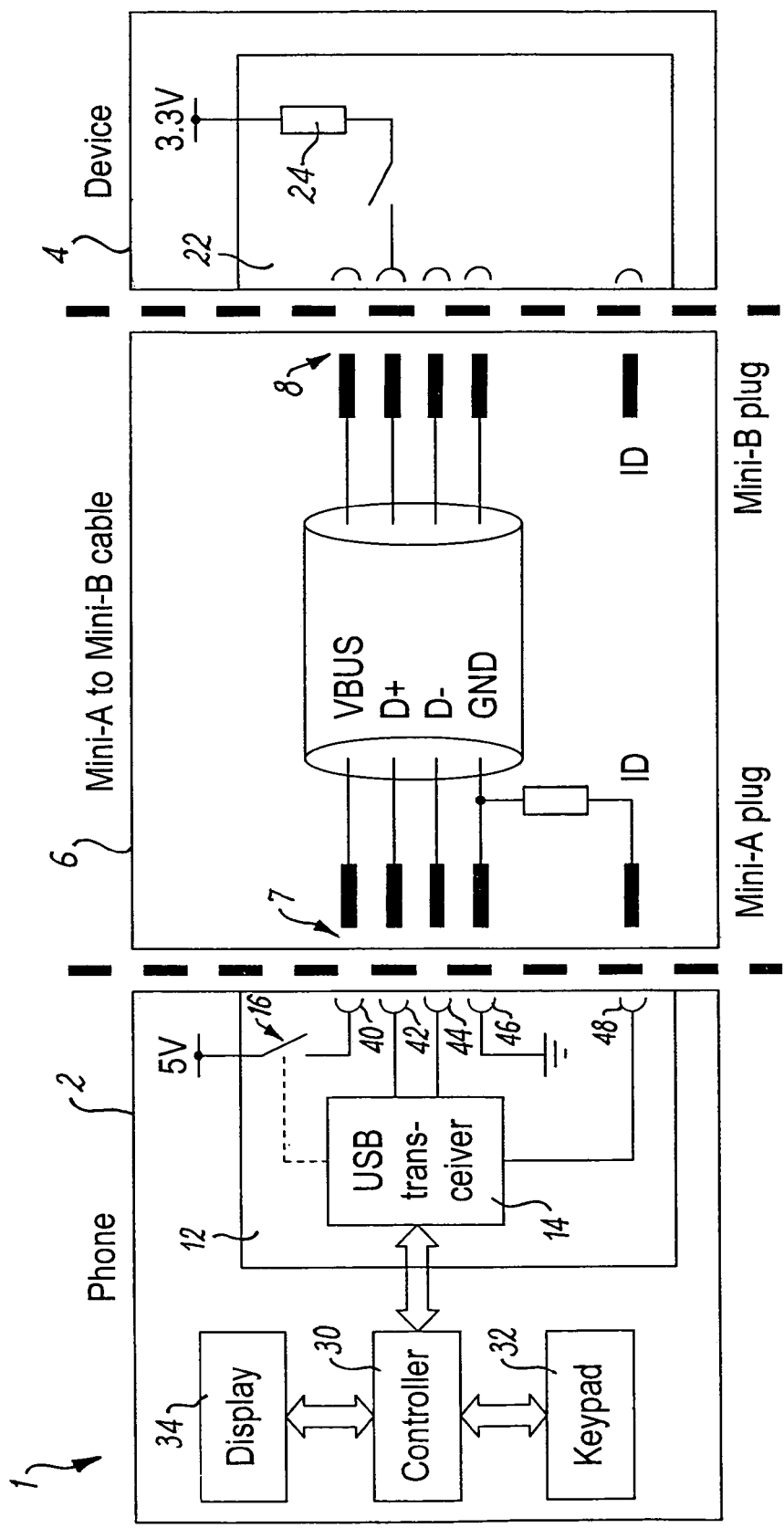
FIG. 1 illustrates a Universal Serial Bus (USB) system according to one embodiment.

FIG. 1 illustrates a Universal Serial Bus (USB) system 1 comprising a first USB device 2 connected to a second device 4 using a cable 6.

The first USB device 2 is, in this example, a dual-mode device and has an interface 12 including a A/B mini receptacle (not shown).The A/B receptacle receives a mini A-plug 7 at one end of the cable 6. The interface 12 may therefore be referred to as an A/B interface but it operates, when connected as shown, as an A-interface or host interface.

The second USB device 4 is, in this example, a peripheral device and has an interface 22 including a mini B receptacle (not shown).The mini B receptacle receives a mini B-plug 8 at the other end of the cable 6. The interface 12 may therefore be referred to as a B-interface or peripheral interface.

Although a cable 6 is illustrated it should be appreciated that adapters, dongles or the like may be connected directly to the A-interface 12 without a cable. Although a mini A-plug to mini B-plug cable is illustrated, in other examples such as when the receptacle of the B-interface 22 has a standard B receptacle a mini A-plug to standard B-plug cable may be used.

The A/B interface 12 of the dual-mode device 2 comprises a USB transceiver 14 and five pin contacts. The first pin contact 40 (Vbus) is used to provide power from the A-device to the B-device. The second pin contact 42 (D+) and the third pin contact 44 (D−) are used as differential data lines for transmitting data between connected devices. The fourth pin contact 46 (GND) is used as an earth or ground. The fifth pin contact 48 (ID) is used to detect, in the dual mode device 2, whether it is connected to a mini A-plug or a mini B-plug. A mini A-plug connects, when inserted, the fourth pin contact 46 (GND) to the fifth pin contact 48 (ID) via a resistor. A mini B-plug, when inserted, leaves the fifth pin contact 48 (ID) isolated.

The first pin contact 40 is connectable to a 5V voltage supply via a controllable switch 16. The switch is controlled by the USB transceiver 14.

The A/B interface 12 is capable of detecting automatically, without user intervention, a device connected to it by periodically polling Vbus. The USB transceiver 14 repeatedly sends a poll signal via the first contact pin 40. The poll signals are sent periodically as a train of voltage pulses that have a constant interval between them. In alternative embodiments the interval may vary.

The USB transceiver 14 achieves this using the controllable switch 16 by periodically switching power on at the first pin contact 40 and then switching power off. The period between the successive occasions on which the USB transceiver 14 switches power on is of the order one second. However, this period may be varied. The duration for which the power is switched on is at least 200 ms but preferably of the order 200 ms. The duration is dependent upon the acceptable delay in responding to device connection/disconnection/reconnection.

The B-interface 22 monitors Vbus and when the voltage on the line exceeds a predetermined threshold, a pull-up resistor 24 is connected to one of the data lines D+, D−. This is not described in detail as this is how a current peripheral USB device responds to a host initiating a session by switching and keeping Vbus on. If the B-interface 22 is a high speed interface then the pull-up resistor is connected to the data line D+ using a switch. If the B-interface 22 is a low speed interface then the pull-up resistor is connected to the data line D− using a switch.

The A/B-interface 12 monitors the second pin contact 42 and the third pin contact 44 and detects when a pull-up resistor 24 is connected to the second pin contact (D+) or the third pin contact (D−). Enumeration may then occur. This is the process described in the USB specifications by which the second device 4 is allocated an address and data is sent from the second device 4 to the default host device 2 that identifies the capabilities of the second device and enables communications between the first device 2 and the second device 4.

The first device 2 may comprise, in addition to A/B-interface 12, a controller 30, a keypad 32 and a display 34. The controller 30 is connected to provide outputs to the display 34 and the A/B interface 12 and to receive inputs from the keypad 32 and the USB transceiver 14 of the A/B interface 12.

The USB transceiver 14 provides a detection signal to the controller 30 when a pull-up resistor 24 is detected from one of the data pin contacts 42, 44. The USB transceiver 14 also provides an indication of the capabilities of the connected second device 4 following enumeration to the controller 30.

The controller 30 may consequently control the display 34 to indicate when a device is connected or disconnected from A/B-interface 12. If a device is newly connected the controller 30 may automatically start a related application or display an identification of the device on the display 34.

The opening and closing of the switch 16 may be controlled by the software of the controller 30. The software would control the periodic polling of Vbus and the monitoring of the data lines for a response.

Another solution is to provide additional hardware (not shown) that controls the periodic opening and closing of the switch 16. The hardware would be initiated by the controller 30. The hardware then periodically polls on Vbus at a rate specified by the controller 30. The USB transceiver can, after initiating the hardware, enter a sleep mode while the hardware manages auto-detection of (dis)connection. The hardware monitor the data lines D for a response to a poll signal on Vbus and when a response is detected it sends an interrupt to the controller 30 to wake it from its sleep mode. This allows the controller 30 to remain in a sleep state for longer, saving power.

The periodic polling on Vbus may be initiated when the USB transceiver detects that a plug has been connected to the A/B interface 12 and a data communication session is not occurring.

The period with which poll signals are sent may be programmed. A longer period saves power but may result in an undesirable delay between a user attaching a plug to the A/B interface 12 and observing a reaction from the first device 2. A short period makes the first device 2 appear responsive when a device is connected or disconnected but uses more power. A value between 1 to 2 seconds is a good compromise.

In summary, the USB transceiver 14 therefore removes power from Vbus to save energy when a data communication session is no longer required. However, in the absence of power on Vbus it is not possible to determine if a new device is connected or a device is disconnected. Therefore, the USB transceiver 14 periodically checks a connection by periodically starting a session, i.e. it periodically sends a poll signal as described above.

Figure 2:
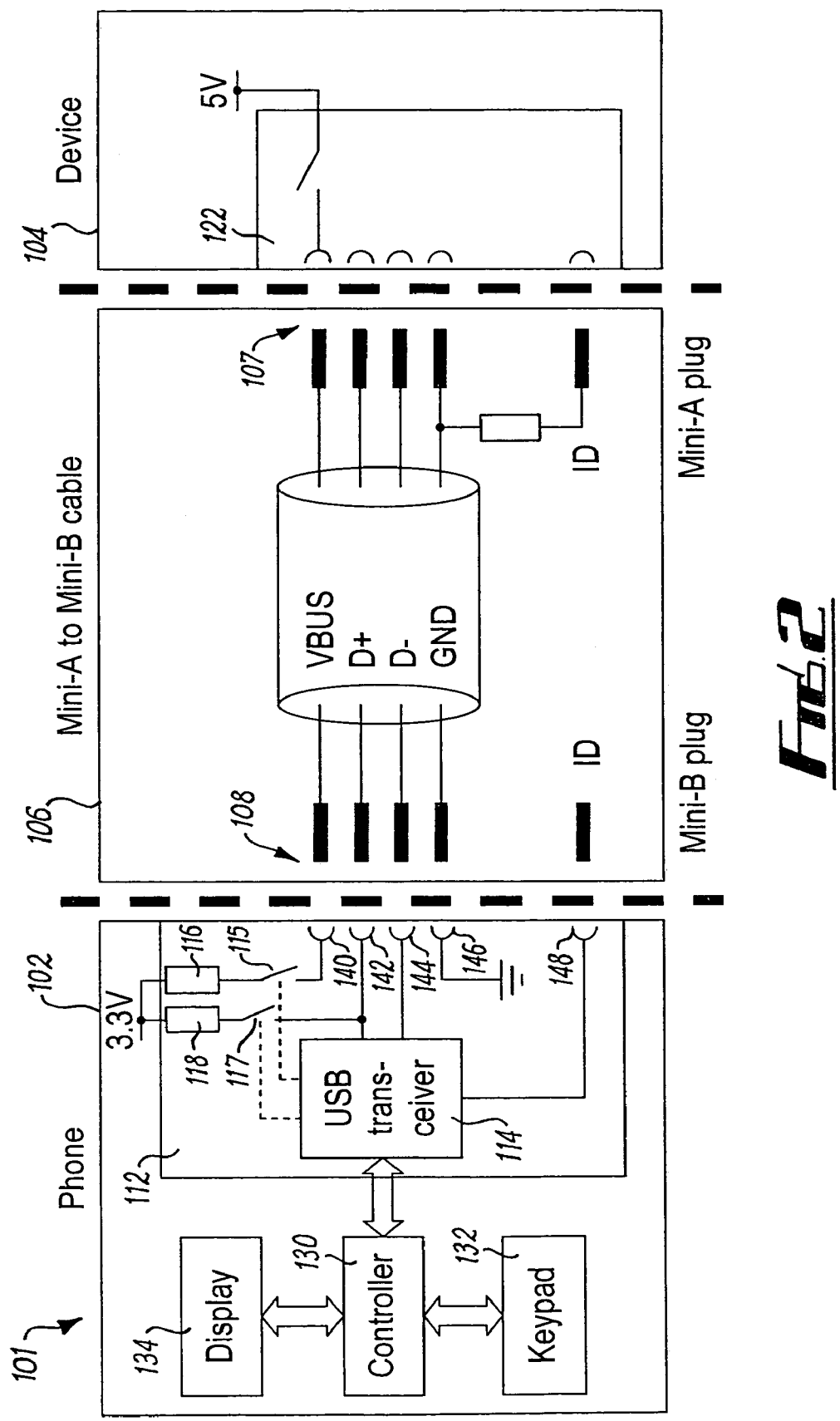
FIG. 2 illustrates a Universal Serial Bus (USB) system according to one embodiment.

FIG. 2 illustrates a Universal Serial Bus (USB) system 101 comprising a first USB device 102 connected to a second device 104 using a cable 106.

The first USB device 102 is, in this example, a dual-mode device and has an interface 112 including a A/B mini receptacle (not shown). The A/B receptacle receives a mini B-plug 108 at one end of the cable 106. The interface 112 may therefore be referred to as an A/B interface but it operates, when connected as shown, as a B-interface or default peripheral interface.

The second USB device 104 is, in this example, another dual-mode device and has an interface 122 including a mini AB receptacle (not shown). The mini AB receptacle receives a mini A-plug 107 at the other end of the cable 106. The interface 122 may therefore be referred to as an A-interface or default host interface.

Although a cable 106 is illustrated it should be appreciated that adapters, dongles or the like may be connected directly to the A/B-interface 122 without a cable.

The A/B interface 112 of the first dual-mode device 102 comprises a USB transceiver 114 and five pin contacts. The first pin contact 140 (Vbus) is used to provide power from the A-device to the B-device. The second pin contact 142 (D+) and the third pin contact 144 (D−) are used as differential data lines for transmitting data between connected devices. The fourth pin contact 146 (GND) is used as an earth or ground. The fifth pin contact 148 (ID) is used to detect, in the first dual mode device 102, whether it is connected to a mini A-plug or a mini B-plug. A mini A-plug connects, when inserted, the fifth pin contact 148 (ID) to the fourth pin contact 146 (GND) via a resistor. A mini B-plug, when inserted, leaves the fifth pin contact 148 (ID) isolated.

The first pin contact 140 (Vbus) is connectable to a 3.3V voltage supply via a controllable switch 115 and a resistor 116. The switch 115 is controlled by the USB transceiver 114.

The second pin contact 142 (D+) is connectable to a 3.3V voltage supply via a controllable switch 117 and a resistor 118. The switch 117 is controlled by the USB transceiver 114.

The A/B interface 112 is capable of detecting automatically, without user intervention, a device connected to it by periodically requesting the second (host) device 104 to start a session using the Session Request Protocol (SRP).

The SRP is defined in the OTG supplement. The USB transceiver 114 turns on the switch 117 to connect D+ to the pull-up resistor 118, it then turns off the switch 117 to disconnect D+ to the pull-up resistor 118, it then turns on the switch 115 to connect Vbus to the pull-up resistor 116 and then turns off the switch 115 to disconnect Vbus from the pull-up resistor 116. This sequence of alternately pulsing D+, then Vbus lasts for less than 100 ms and is repeated periodically. This period is of the order one second. However, it may be varied.

The USB transceiver 114 monitors the state of Vbus via the first pin contact 140, as an attached host interface 122 responds to SRP by turning Vbus on i.e. applying a voltage to it.

The operational modes of the first and second devices may be switched using the Host Negotiation Protocol (HNP) specified by the OTG supplement. This allows the first dual mode device to operate as host and the second dual mode device 104 to operate as a peripheral. Enumeration may then occur. This is the process described in the USB specifications by which the peripheral device 104 is allocated an address and data is sent from it to the host device 102 that identifies the capabilities of the second device 104 and enables communications between the first device 102 and the second device 104.

The first dual mode device 102 may comprise, in addition to the A/B-interface 112, a controller 130, a keypad 132 and a display 134. The controller 130 is connected to provide outputs to the display 134 and the A/B interface 112 and to receive inputs from the keypad 132 and the USB transceiver 114 of the A/B interface 112.

The USB transceiver 114 provides a detection signal to the controller 130 when a constant voltage is sensed on the first pin contact 140 (Vbus). The USB transceiver 114 also provides an indication of the capabilities of the connected second device 104 following enumeration to the controller 130.

The controller 130 may consequently control the display 134 to indicate when a device is connected or disconnected from A/B-interface 112. If a device is newly connected the controller 130 may automatically start a related application or display an identification of the device on the display 134.

The opening and closing of the switches 115 and 117 may be controlled by the software of the controller 130. The software would control the periodic pulsing of Vbus and D+ and the monitoring of Vbus for a response. Another solution is to provide additional hardware (not shown) that controls the periodic opening and closing of the switches 115 and 117. The hardware would be initiated by the controller 130. The hardware then periodically pulses D+ then Vbus at a rate specified by the controller 130. The USB transceiver can, after initiating the hardware, enter a sleep mode while the hardware manages auto-detection of (dis)connection. The hardware monitors Vbus for a response to SRP and when a response is detected it sends an interrupt to the controller 130 to wake it from its sleep mode. This allows the USB controller 130 to remain in a sleep state for longer, saving power.

The periodic SRP (pulsing D+ then Vbus) may be initiated when the USB transceiver detects that a plug has been connected to the A/B interface 12 and a data communication session is not occurring.

The period with which SRP is initiated may be programmed. A longer period saves power but may result in an undesirable delay between a user attaching a plug to the A/B interface 12 and observing a reaction from the first device 2. A short period makes the first device 2 appear responsive when a device is connected or disconnected but uses more power. A value between 1 to 2 seconds is a good compromise.

In summary, the USB transceiver 14 periodically checks a connection by periodically requesting a session, i.e. it periodically pulses D+ and Vbus.

Any A-device, including a PC or laptop, is allowed to respond to SRP. Any B-device, including a standard USB peripheral, is allowed to initiate SRP. A dual-role device is required to be able to initiate and respond to SRP.

Although the embodiments of FIGS. 1 and 2 have been described separately, it should be appreciated that is envisioned that a single dual mode device will have an A/B interface that provides the functionality of the A/B interface described with reference to FIG. 1 and the functionality of the A/B interface described with reference to FIG. 2. The functionality of FIG. 1 is used when the dual-mode device is connected as an A-device (default host) and the functionality of FIG. 2 is used when the dual-mode device is connected as a B-device (default peripheral).

Although embodiments of the present invention have been described in the preceding paragraphs with reference to various examples, it should be appreciated that modifications to the examples given can be made without departing from the spirit and scope of the invention. For example, although the additional electronic circuitry provided for embodiments of this invention such as controllable switch 16 in FIG. 1 and resistors 116, 118 and switches 117, 115 in FIG. 2 are illustrated as separate from the USB transceiver, they may in other embodiments be integrated within the USB transceiver.

The invention claimed is:

1. An interface connectable as a default host interface to a peripheral or as a default peripheral interface to a host, for serial data communication between a host and a peripheral during a session, and comprising:
   a power signal contact;
   at least one data signal contact;
   first automated means for periodically checking a connection by periodically starting a session when connected as a default host interface;
   second automated means for periodically checking a connection by periodically requesting a session when connected as a default peripheral interface; and
   wherein when connected as a default host interface, the first automated means for periodically checking a connection is operable to periodically apply a voltage to the power signal contact and to receive a response via the data signal contact, and when connected as a default peripheral interface, the second automated means for periodically checking a connection is operable to periodically request a session via the power signal contact and the data signal contact and receive a response via the power signal contact.

2. An interface as claimed in claim 1, wherein a session identifies the presence of a connected device.

3. An interface as claimed in claim 1, wherein a session identifies the capabilities of a connected device.

4. An interface, for serial data communication between a host and a peripheral, the interface connectable as a default host interface or as a default peripheral interface and comprising:
   a power signal contact;
   at least one data signal contact;
   transmission means for repeatedly sending a poll signal via the power signal contact to check a connection; and
   reception means for receiving a reply signal via the power signal contact if the interface is connected as a default peripheral interface, and the data signal contact if the interface is connected as a default host interface, wherein the reply signal indicates the presence of a connected device.

5. An interface as claimed in claim 4, wherein the poll signals are sent periodically as a train of voltage pulses.

6. An interface as claimed in claim 5, wherein each pulse of the train has a duration greater than 200 ms.

7. An interface as claimed in claim 5, wherein the poll signals have a periodicity of the order of 1 Hz such that each pulse of the train is separated from its neighbor by the same duration of the order of 1 second.

8. An interface as claimed in claim 4, wherein the transmission means is operable to repeatedly send a poll signal only via the power signal contact if the interface is connected as a default host interface.

9. An interface as claimed in claim 4 wherein the transmission means is operable to repeatedly send both a first poll signal via the power signal contact and a second poll signal via the data signal contact, if the interface is connected as a default peripheral interface.

10. An interface as claimed in claim 4, further comprising an identifier contact for identifying whether the interface is connected to a peripheral or a host.

11. An interface as claimed in claim 4, wherein a session is started that identifies the capabilities of a connected device.

12. A host interface, for serial data communication between a host and a connected peripheral during a session, the host interface comprising:
    a power signal contact for supplying power to the connected peripheral;
    at least one data signal contact for serially communicating data between the host and connected peripheral;
    means for periodically checking for disconnection from the peripheral comprising:
    transmission means for repeatedly sending a poll signal via the power signal contact;
    reception means for receiving a reply signal via the data signal contact; and
    detection means for detecting the absence of a reply signal and the disconnection of the peripheral.

13. A host interface as claimed in claim 12, arranged to periodically start a session on its own initiative or in response to periodic requests from the connected peripheral.

14. A peripheral interface, for serial data communication between a connected host and a peripheral during a session, the peripheral interface comprising:
    a power signal contact for receiving power from the connected host;
    at least one data signal contact for serially communicating data between the connected host and peripheral;
    means for periodically checking for disconnection from the host comprising:
    transmission means for repeatedly sending a first poll signal via the power signal contact and for repeatedly sending a second poll signal via the data signal contact;
    reception means for receiving a reply signal via the power signal contact; and
    detection means for detecting the absence of a reply signal and the disconnection of the peripheral.

15. A peripheral interface as claimed in claim 14, arranged to periodically request a session.

16. An interface as claimed in claim 15, wherein each request has a duration less than 100 ms.

17. A method of checking a serial data connection between a dual mode device and another device, the dual mode device comprising a power signal contact and a data signal contact, the method comprising:
    when the dual mode device is connected as a default host, checking the connection by periodically starting a session via the power signal contact of the dual mode device and determining whether a response is received at the data signal contact of the dual mode device after each session initiation, wherein receipt of a response indicates that the other device is connected; and
    when the dual mode device is connected as default peripheral, checking the connection by periodically requesting the start of a session at the dual mode device via the power signal contact and the data signal contact and determining whether a response is received at the power signal contact of the dual mode device after each session request wherein receipt of a response indicates the other device is connected.

18. An interface for use in a device, the interface for connecting the device to a serial data communication bus either as a default host or as a default peripheral, serial data communication occurring between a host and a peripheral connected to the serial data communication bus during a session, the interface comprising:
- a power signal contact;
- at least one data signal contact;
- a transceiver arranged to periodically check a connection by periodically starting a session when the device is connected as a default host and by periodically requesting a session when the device is connected as a default peripheral; and
- wherein when the device is connected as a default host, the transceiver is operable to periodically check a connection by periodically applying a voltage to the power signal contact and receiving a response via the data signal contact, and when the device is connected as a default peripheral, the transceiver is operable to periodically check a connection by periodically requesting a session via the power signal contact and the data signal contact and receiving a response via the power signal contact.

19. An interface for use in a device, the interface for connecting the device to a serial data communication bus either as a default host or as a default peripheral, serial data communication occurring between a host and a peripheral connected to the serial data communication bus, the interface comprising:
- a power signal contact;
- at least one data signal contact; and
- electronic circuitry for repeatedly sending a poll signal via the power signal contact to check a connection and for receiving a reply signal via the power signal contact, if the device is connected as a default peripheral and via the data signal contact if the device is connected as a default host, wherein the reply signal indicates the presence of a connected device.

20. A host interface for use in a host, the host interface for connecting the host to a serial data communication bus, serial data communication occurring between the host and a peripheral connected to the serial data communication bus during a session, the host interface comprising:
- a power signal contact for supplying power to the connected peripheral;
- at least one data signal contact for serially communicating data between the host and connected peripheral;
- electronic circuitry for periodically checking for disconnection from the peripheral, wherein the electronic circuitry is arranged to repeatedly send a poll signal via the power signal contact and is arranged to receive a reply signal via the data signal contact; and
- detection means for detecting the absence of a reply signal and the disconnection of the peripheral.

21. A peripheral interface for use in a peripheral, the peripheral interface for connecting the peripheral to a serial data communication bus, serial data communication occurring between the peripheral and a host connected to the serial data communication bus during a session, the peripheral interface comprising:
- a power signal contact for receiving power from the connected host;
- at least one data signal contact for serially communicating data between the connected host and peripheral;
- a electronic circuitry for periodically checking for disconnection from the host, wherein the electronic circuitry is arranged to repeatedly send a first poll signal via the power signal contact and to repeatedly send a second poll signal via the data signal contact and is arranged to receive a reply signal via the power signal contact; and
- detection means for detecting the absence of a reply signal and the disconnection of the peripheral.

* * * * *